United States Patent

Isoya et al.

[11] 4,316,075
[45] Feb. 16, 1982

[54] AUTOMATIC WELDING POSITION CONTROL METHOD, AND DEVICE

[75] Inventors: Toshisuke Isoya; Masayuki Mishiro; Naohiko Yokoshima, all of Hirakata, Japan

[73] Assignee: Kabushiki Kaisha Komatsu Seisakusho, Tokyo, Japan

[21] Appl. No.: 138,292

[22] Filed: Apr. 8, 1980

[51] Int. Cl.³ .............................................. B23K 9/12
[52] U.S. Cl. ........................... 219/124.22; 219/125.12
[58] Field of Search ...................... 219/124.22, 124.34, 219/125.12

[56] References Cited

U.S. PATENT DOCUMENTS 4,151,395  4/1979  Kushner et al. ................ 219/124.34
4,192,986  3/1980  Udagawa et al. .............. 219/124.34

FOREIGN PATENT DOCUMENTS 2631250  2/1977  Fed. Rep. of Germany ........................ 219/124.22
51-91851  8/1976  Japan .............................. 219/124.22
7706221  1/1978  Netherlands ................... 219/124.22

Primary Examiner—C. C. Shaw
Attorney, Agent, or Firm—Spensley, Horn, Jubas & Lubitz

[57] ABSTRACT

A welding method in which a pair of base metals are welded together by swinging the welding torch right and left, and a device for practicing the method. In the method, the arc current is continuously detected, and sampling pulses are formed in time slots provided by the swinging motion of the torch. The arc welding currents are sampled and held with the aid of the sampling pulses, whereby the peak values of arc currents flowing when the torch is swung right and left are detected, and the position of the torch is correctively shifted right or left according to the difference between these peak values.

4 Claims, 3 Drawing Figures

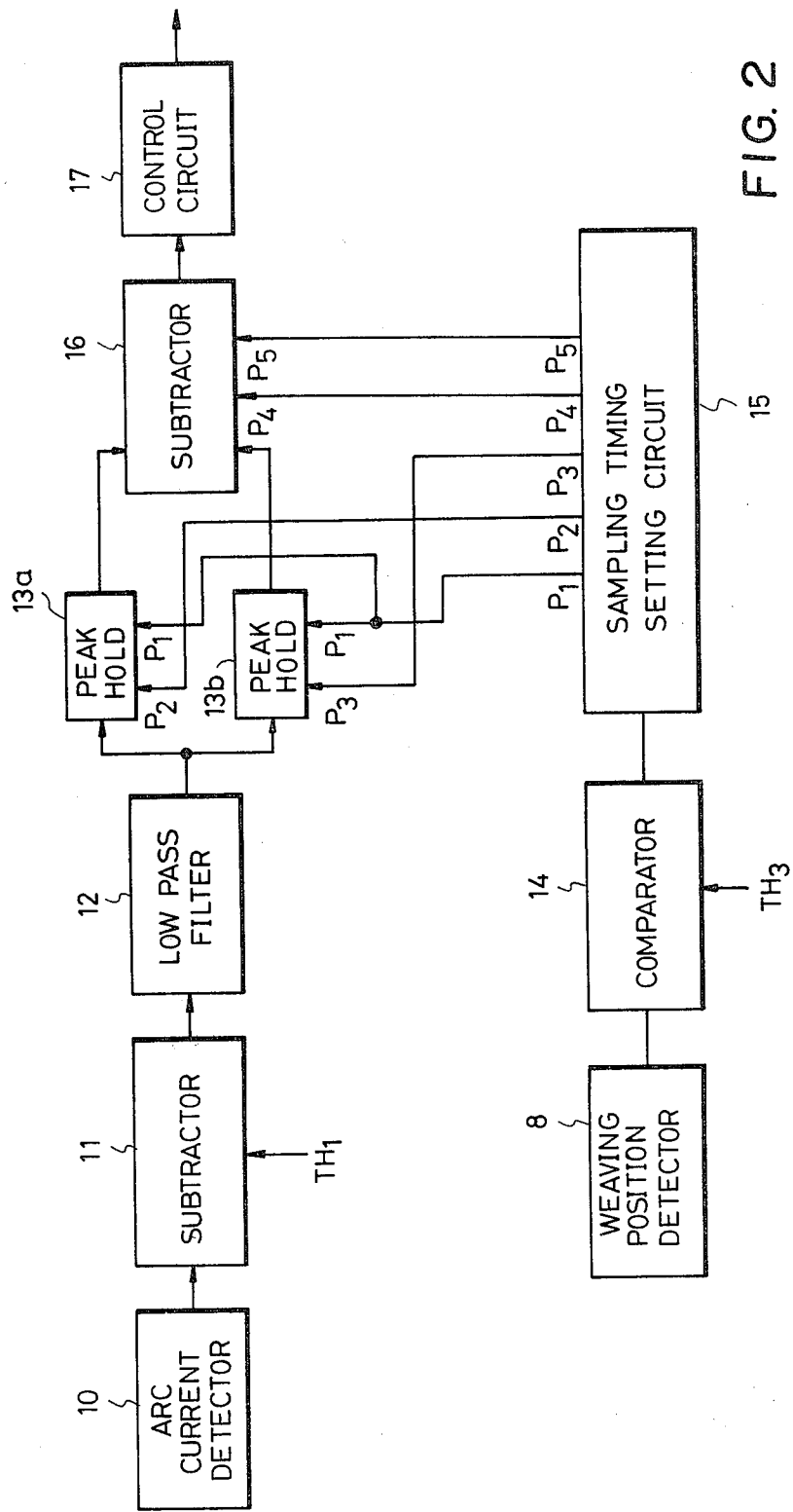

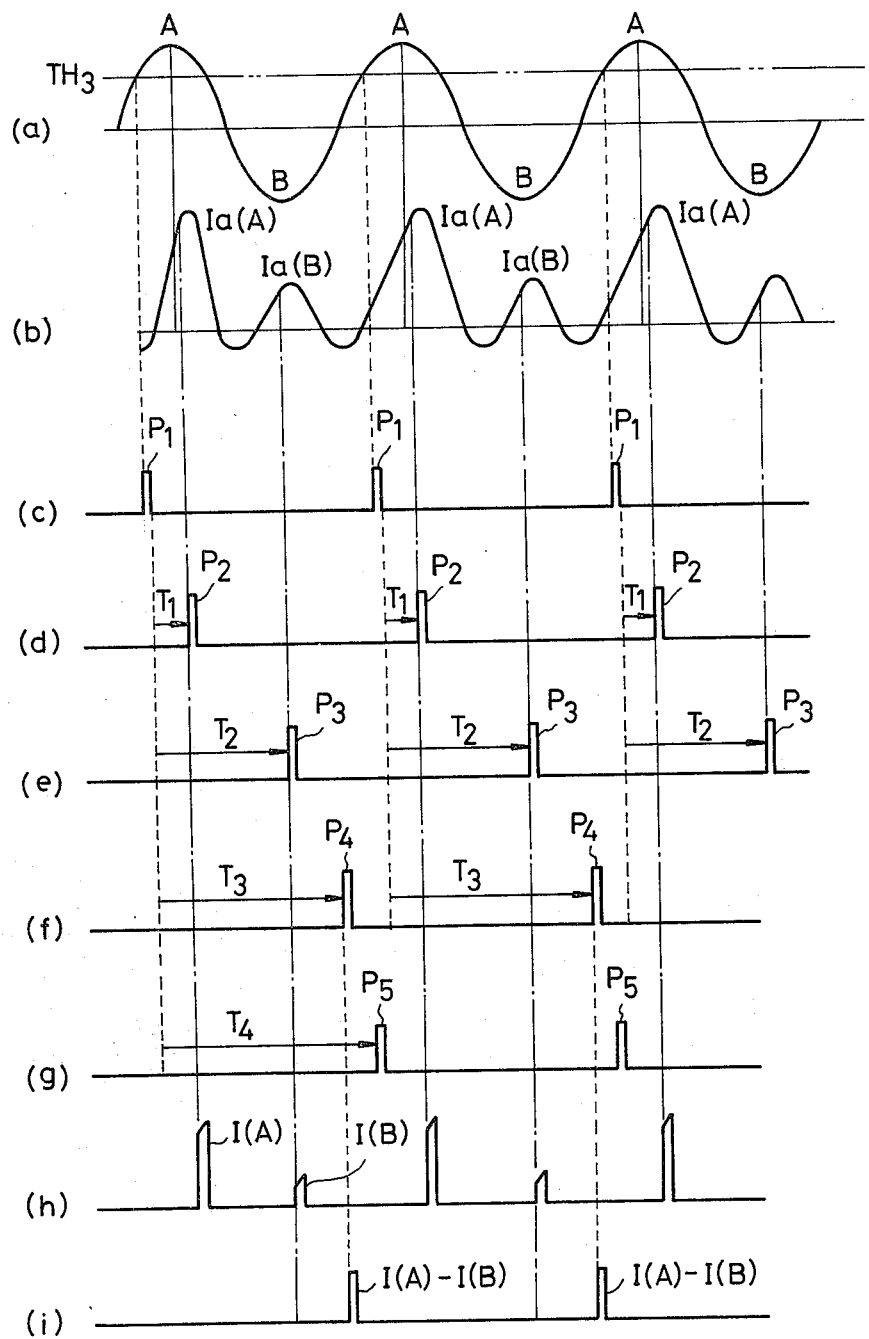

AUTOMATIC WELDING POSITION CONTROL METHOD, AND DEVICE

BACKGROUND OF THE INVENTION

This invention relates to a weaving welding method utilizing the self-control characteristic of arc, and more particularly to an automatic arc welding position control method in which the peak values of arc currents flowing when the welding torch is brought closest to both ends of weaving are subjected to comparison, so that the position of the welding torch is corrected by regarding the difference between the peak values as the amount of shift of the welding torch relative to the arc generating position, and a device for practicing the method.

In a conventional automatic welding position control method for a weaving welding method in which welding is carried out by a welding torch which is swung right and left above the welding line; arc current is averaged, and a value obtained by integrating the thus averaged arc current for a certain period of time after the welding torch has reached one end of the weaving is subtracted from a value obtained by integrating the averaged arc current for the same period of time after the welding torch has reached the opposite end of the weaving, so that the welding torch is shifted to a correct position above the welding line according to the result of subtraction.

However, the above-described conventional method is still disadvantageous in that, when the weaving period is relatively large, the welding position detecting sensitivity is lowered.

SUMMARY OF THE INVENTION

Accordingly, an object of this invention is to provide an automatic welding position control method in which the above-described difficulty accompanying a conventional automatic welding position control method has been eliminated, and a device for practicing the method.

Another object of the invention is to provide an automatic welding position control method in which the welding position can be controlled with high accuracy irrespective of the weaving period, and a device for practicing the method.

A further object of the invention is to provide an automatic arc welding position control method in which the peak values of arc currents flowing when the welding torch is brought to both ends of a weaving arc are subjected to comparison, so that the position of the welding torch is controlled according to the comparison result signal.

The novel features which are considered characteristic of this invention are set forth in the appended claims. This invention itself, however, as well as other objects and advantages thereof will be best understood by reference to the following detailed description of illustrative embodiments, when read in conjunction with the accompanying drawings, in which like parts are designated by like reference numerals.

BRIEF DESCRIPTION OF THE DRAWINGS

In the accompanying drawings:

FIG. 2 is a block diagram showing a device for practicing an automatic weaving welding position control method according to this invention; and FIG. 3 is a graphical representation indicating the waveforms of various signals in the device shown in FIG. 2.

DETAILED DESCRIPTION OF THE INVENTION

Figure 1:
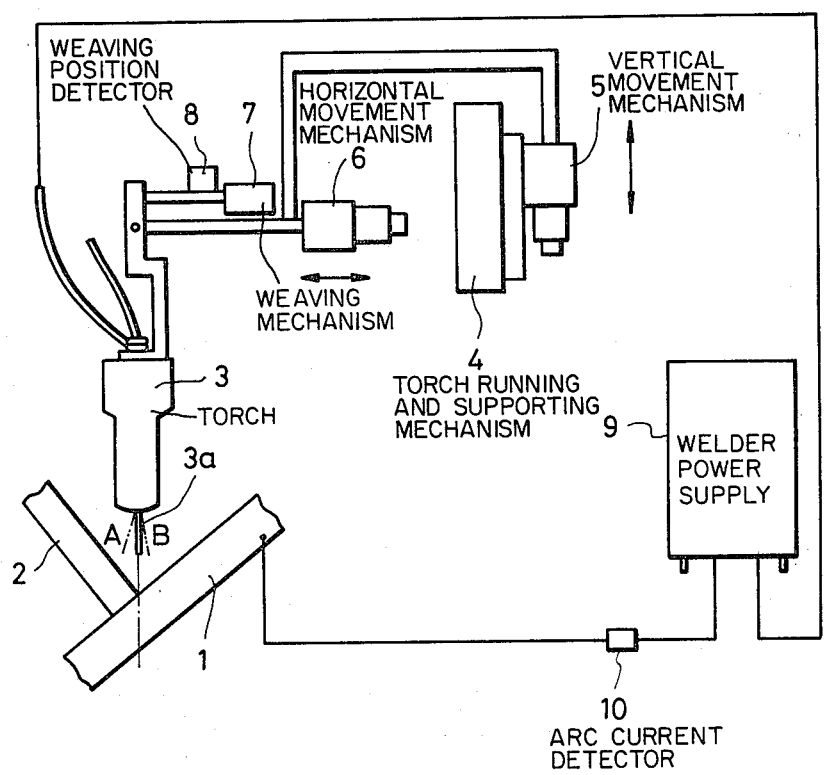
FIG. 1 is an explanatory diagram showing the arrangement of a weaving welding apparatus.

This invention will be described with reference to its preferred embodiment.

One example of a control device for practicing an automatic welding position control method according to the invention is as shown in FIG. 1. A welding torch 3 is positioned above the welding line of welding base metals. The welding torch 3 is moved in a direction (perpendicular to the plane of the drawing) by being supported by a torch running and supporting mechanism 4 which moves along the welding line. A vertical movement mechanism 5 adapted to move the welding torch 3 vertically and a horizontal movement mechanism 6 adapted to move the welding torch 3 horizontally are provided between the welding torch 3 and the torch running and supporting mechanism 4. The welding torch 3 is so designed that the end of a wire 3a protruded from the end of the welding torch 3 is caused to weave in a range of A to B by a weaving mechanism 7. The weaving position of the welding torch 3 is detected by a weaving position detector 8.

In order to start fillet-welding of the base metals 1 and 2, the welding torch 3 is positioned above the welding line and welding current is applied to the welding torch from a welder power supply 9. Then, in response to the weaving of the welding torch 3, the weaving position detector 8 outputs a weaving position detection signal as shown in the part (a) of FIG. 3. Simultaneously, the variation of arc current due to the weaving of the welding torch 3 is detected by an arc current detector 10 connected between the welding power supply 9 and the base metal 1.

In the case where the welding torch 3 carries out the fillet-welding in a correct positional relationship with respect to the welding line, the peak values of arc current flowing when the wire 3a is brought closest to the base metals 1 and 2 by the weaving of the welding torch, i.e. the peak values of arc current flowing when the wire 3a reaches near both ends of the weaving, are equal to each other. However, when the welding torch 3 is shifted, for instance, toward the base metal 2 from the welding line, then the peak value of arc current detected by the arc current detector 10 is increased at the weaving end (A) and is decreased at the weaving end (B) as shown in the part (b) of FIG. 3. Accordingly, in this case, the welding torch is shifted horizontally as much as the difference between these peak values. However, the correct welding position can be obtained by moving the welding torch in a direction opposite to the direction of shifting by a distance corresponding to the aforementioned difference.

One example of a device for practicing the automatic welding position control method according to the invention is as shown in FIG. 2.

An arc current signal from the arc current detector 10 is subjected to subtraction in a subtractor 11. The subtraction is carried out by applying the arc current signal to the positive input terminal of an operational amplifier and applying a signal TH1 having a predetermined level to the negative input terminal of the operational amplifier. The purpose of the subtraction is to eliminate a component such as a arc noise component which does not essentially relate to the weaving, among signals from the arc current detector 10. A low-pass filter 12 is connected to the subtractor 11. The low-pass filter 12 operates to eliminate unnecessary components, such as for instance an arc noise component, similarly as in the case of the subtractor.

On the other hand, the weaving position detection signal as shown in the part (a) of FIG. 3 is outputted by the weaving position detector 8, and is then applied to a comparator 14. A signal TH3 having a predetermined level as shown in the part (a) of FIG. 3 is applied to the comparator 14. Whenever the weaving position detection signal exceeds the level signal TH3, the comparator 14 provides a pulse P1 as shown in the part (c) of FIG. 3. (The level signal TH3 may be of the 0 level.). The pulse P1 is applied to a sampling timing setting circuit 15. The sampling timing setting circuit 15 form pulses P2, P3, P4 and P5 with the pulse P1 as a time reference. The arrangement of the sampling timing setting circuit 15, for instance, comprises: a counter whose counting operation is started in response to the pulse P1; a plurality of comparators adapted to compare the count values of the counter with predetermined values, to provide the pulses P2 through P5.

The pulse P2 is used to sample a peak current flowing when the welding torch is near the weaving end A. The pulse P3 is used to sample a peak current flowing when the welding torch is near the weaving end B. Accordingly, value T1 and T2 as shown in the parts (d) and (e) of FIG. 3 are so selected as to catch the respective peak currents.

Thus, when the pulse P1 is applied to peak hold circuits 13a and 13b by the sampling timing setting circuit 15, the peak hold circuits 13a and 13b are reset. When, under this condition, the pulse P2 is applied to the peak hold circuit 13a, the peak current value I(A) provided when the welding torch is near the weaving end A is held by the circuit 13a and when the pulse P3 is applied to the peak hold circuit 13b, the peak current value I(B) provided when the welding torch is near the weaving end B is held by the circuit 13b. The peak currents thus held are as shown in the part (h) of FIG. 3.

The pulse P4 is a subtraction instruction pulse. When the pulse P4 is applied to a subtractor 13, the following subtraction is carried out:

$$I(A) - I(B)$$

The result of this subtraction is proportional to the amount of shift between the welding torch 3 and the welding line. Therefore, the subtraction result is applied to a control circuit 17, so that the output of the control circuit 17 drives the horizontal movement mechanism 3 to move the welding torch 3 to a correct position above the welding line. The pulse P5 as shown in the part (g) of FIG. 3 is used to reset the subtractor 16, etc.

While the invention has been described with respect to the fillet welding, it is obvious that the technical concept of the invention is applicable to L-beveled, V-beveled or J-beveled base metal welding also.

What is claimed is:

1. An automatic welding position control device comprising:
    weaving position detecting means for providing a substantially continuous weaving position signal proportional to the position of a reciprocating welding torch;
    arc current detecting means for detecting welding arc current;
    means for providing a control pulse when an output level of said weaving position detecting means is larger than a predetermined value;
    a sampling timing setting circuit for producing sampling pulses and a subtraction instruction pulse in predetermined time relation to said control pulse;
    a pair of holding means for sampling an output of said arc current detecting means in response to said sampling pulses and holding a sampled peak value thereof;
    a subtractor for providing a signal proportional to the difference between the outputs of said holding means in response to the subtraction instruction pulse; and
    a control circuit for shifting said welding torch to a correct position above the welding line according to said difference.

2. In a weaving welding method in which welding is carried out by moving a welding torch in a reciprocating fashion above a welding line, an automatic arc welding position control method comprising the steps of:
    obtaining the peak values of arc currents flowing when said welding torch is swung right and left, respectively, wherein said step of obtaining the peak values comprises the steps of:
    detecting said arc currents continuously;
    providing a continuous weaving position signal proportional to the position of said welding torch;
    providing sampling pulses having predetermined time widths with a predetermined level of said weaving position signal as a reference;
    sampling peak values of the arc currents under the control of said sampling pulses when a wire of said welding torch is brought to right and left positions over said welding line; and
    holding said peak values thus sampled; obtaining a difference between said peak values;
and
    shifting said welding torch according to said difference.

3. A method as claimed in claim 2, which further comprises: a step of eliminating arc noise from said arc current signal detected.

4. An automatic welding position control device, comprising:
    weaving position detection means for providing a continuous weaving position signal proportional to the position of a welding torch which reciprocates above a welding line;
    arc current detecting means for detecting welding arc current;
    a comparator for comparing the weaving position signal with a reference signal and providing a first control pulse when the weaving position signal exceeds the level of reference signal;
    timing circuitry for providing first and second sampling pulses and a subtraction instruction pulse at predetermined increments of time after the first control pulse;
    first and second peak hold circuits for detecting the peak value of the welding arc current during the first and second sampling pulses, respectively; and
    a subtractor for providing an output signal representative of the difference between the held value of the first peak hold circuit and the held value of the second peak hold circuit in response to the subtraction instruction pulse.

* * * * *